United States Patent

[11] 3,545,573

[72] Inventor David W. Barton
 Birmingham, Michigan
[21] Appl. No. 819,327
[22] Filed April 25, 1969
[45] Patented Dec. 8, 1970
[73] Assignee Ford Motor Company
 Dearborn, Michigan
 a corporation of Delaware

[54] AUTOMATICALLY ADJUSTABLE DISC BRAKE
 7 Claims, 5 Drawing Figs.
[52] U.S. Cl. .................. 188/72.9,
 188/79.5, 188/196
[51] Int. Cl. .................. F16d 65/52
[50] Field of Search.. .................. 188/71.7,
 71.8, 72.9, 79.5(GE), 79.5(K), 196(M), 196(RR),
 196(SUV)

[56] References Cited
UNITED STATES PATENTS
1,865,772 7/1932 Lyman .................. 188/192(RR)X
3,433,333 3/1969 Swift .................. 188/196X Primary Examiner—George E. A. Halvosa
Attorney—John R. Faulkner and Roger E. Erickson ABSTRACT: A mechanically actuated floating caliper disk brake having an actuating lever pivotally mounted to a fulcrum member which, in turn, is rotatable relative to the caliper member. The lever pivot is eccentric to the center of rotation of the fulcrum member. A ratchet mechanism rotates the fulcrum member and automatically adjusts the pivot point of the actuating lever to compensate for wear of the brake shoes.

PATENTED DEC 8 1970

INVENTOR
DAVID W. BARTON
BY John R. Faulkner
Roger E. Erickson
ATTORNEYS

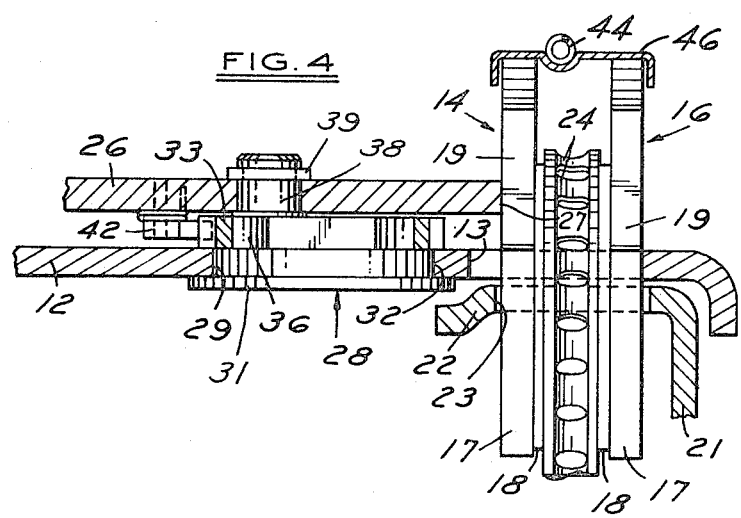
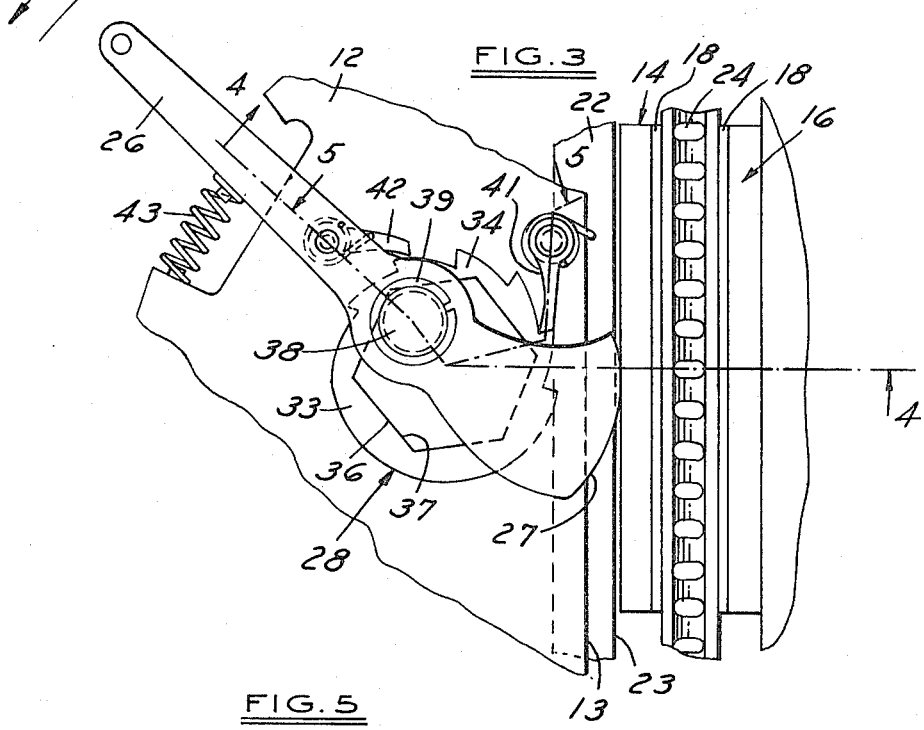
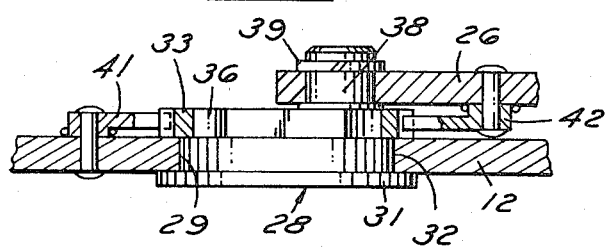

3,545,573

AUTOMATICALLY ADJUSTABLE DISC BRAKE

BACKGROUND OF THE INVENTION

One of the factors discouraging more widespread usage of four wheel disc brakes in automotive vehicles is the high cost, as compared with conventional drum type brakes, of providing a suitable automatically adjustable parking brake mechanism. In the conventional drum type brake, the same brake shoe and automatic adjustment means are used for the parking brake as for service brake. Thus, in order for four wheel disc brakes to gain widespread usage, an economically competitive design for a parking brake is needed.

This invention provides a parking brake construction for use with disc brakes that is economical to manufacture, reliable in operation, that automatically adjusts to accommodate the wear of the friction members. The invention further provides a brake mechanism which mechanically actuates independently of the hydraulic service brake a set of friction members. The invention also provides a brake construction in which an economical stamped caliper member may be successfully incorporated.

BRIEF SUMMARY OF THE INVENTION

A brake mechanism constructed in accordance with this invention includes in combination with a rotatable brake disc a pair of friction members or shoes engageable with the opposite sides of the brake disc, a caliper member having a opening which receives the brake disc and supports the friction members on each side of the brake disc, and a fulcrum member rotatably mounted to the caliper member. A lever means is rotatably and eccentrically mounted to the fulcrum member to pivot about an axis spaced from the axis of rotation of the fulcrum member. One end of the lever is engageable with one of the friction members move relatively together to grip the brake disc and thereby to provide vehicle braking. A means to selectively lock the fulcrum member to a position relative to the caliper member is also provided.

BRIEF DESCRIPTION OF THE DRAWINGS

FIG. 3 is a top view of a portion of the caliper member showing the relationship of the actuating lever to the brake shoes.

FIG. 4 is a cross-sectional view taken along lines 4—4 of FIG. 3.

FIG. 5 is a cross-sectional view along lines 5—5 of FIG. 3.

DETAILED DESCRIPTION OF THE PREFERRED EMBODIMENT

Figure 1:
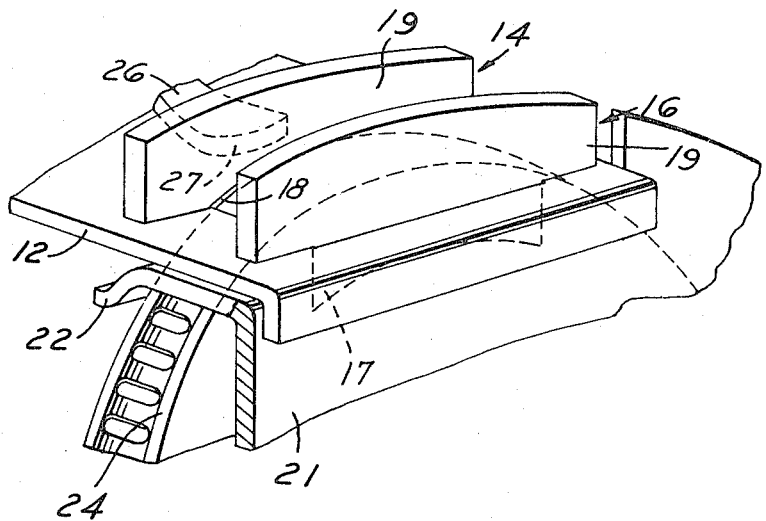
FIG. 1 is a perspective view of a disc brake mechanism constructed in accordance with the invention.
Figure 2:
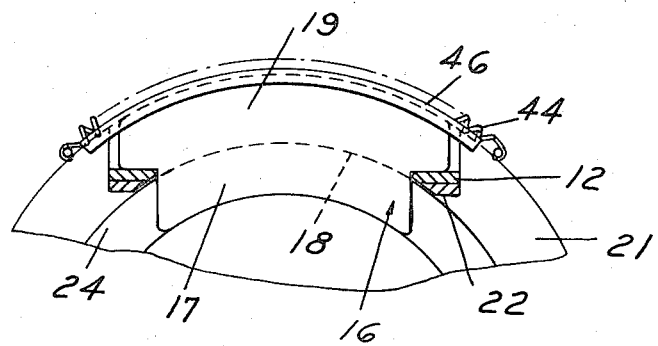
FIG. 2 is an axial view of the upper portion of a torque plate and portions of the disc brake mechanism.

The preferred embodiment of the invention includes a stamped steel caliper member 12 having a rectangular opening 13 formed therein which suspendedly receives a pair of friction members or brake shoes 14 and 16. The brake shoes are generally T-shaped having lower portions 17 that include friction linings or pads 18. The width of the lower portion 17 is approximately equal to that of the opening 13. The width of the upper portions 19 of the brake shoes 14 and 16 is greater than that of the opening 13 to permit the shoes 14 and 16 to be suspended from from caliper member 12.

The caliper member 12 is mounted on a combination torque plate-dirt shield 21 which, in turn, is mounted on the wheel support spindle of the automotive vehicle. A portion 22 of the generally circular torque plate 21 is bent sidewardly and provides means to support the caliper member 12. An opening 23 is formed in the torque plate, corresponding to the opening 13 of the caliper member, which receives the lower portion 17 of the shoes and permits a portion of the circumference of the brake disc 24 to extend therethrough. Brake disc 24 is rigidly attached to the vehicle wheel (not shown).

An actuating lever 26 having a cam surface 27 is pivotally mounted to a fulcrum member 28. Fulcrum member 28 is rotatably mounted within a circular opening 29 for formed within caliper member 12. The pivot axis of the lever 26 is spaced apart from the pivot axis of the fulcrum member 28. The fulcrum member 28 is formed with a head portion 31 which engages the underside of the caliper member 12. A cylindrical surface 32 engages the corresponding circular opening 29 of the caliper member. Surface 32 and opening 24 may be plated or coated with suitable materials to prevent corrosion and insure ease of rotation of the fulcrum member 28 within the caliper member 12.

A ratchet wheel 33 having a series of teeth 34 is positioned about a hexagonal portion 36 of the fulcrum member 28. Ratchet wheel 33 has a hexagonal opening 37 formed therein which corresponds to portion 36 and provides a fixed coupling between the fulcrum member 28 and the ratchet wheel 33. The fulcrum wheel 33 includes a pivot pin 38 positioned eccentrically relative to the cylindrical portion 32 to which the lever 26 is pivotally mounted. A ring clip 39 is positioned in an annular groove at the end of the pin 38 to hold the lever 26, the fulcrum member 28 and the ratchet 33 in position on the caliper member 12.

A spring biased pawl 41 is pivotally attached to the caliper member 12 and engages the ratchet wheel 33 preventing its rotation relative to the caliper member 12 upon counterclockwise rotation of the lever 26 as shown in FIG. 3.

A second pawl 42 is pivotally mounted to the lever 26 and is resiliently biased into engagement with the ratchet 33. The arcuate length of the ratchet teeth 34 is such that when no wear has yet occurred in the brake linings 18 the lever 26 can be angularly displaced an amount sufficient to fully apply the parking brake without pawl 42 advancing to the next ratchet tooth. It is only when significant wear has occurred in the brake linings 18 that the angular displacement of the lever 26 is sufficient to permit pawl 42 to advance to the next tooth. Upon the release movement of th lever means following an advance of pawl 41 to a successive tooth the fulcrum member 28 is rotated relative to the caliper member 12 in the direction permitted by pawl 41 by the force of the compression spring 43 acting through lever 26.

The cam surface 27 of the lever 26 is of an increasing radius so that when the lever is moved counterclockwise as shown in FIG. 3, the radial distances of the cam surface 27 increase and cause the brake shoe 14 to move rightwardly and engage brake disc 24.

The caliper member 12 is of the floating type and thus limited movement between caliper 12 and the torque plate 21 in the axial direction is experienced during brake application and release.

A cover portion 46 is positioned over the upper portions of the brake shoes 14 and 16 and is retained to the torque plate 21 by a coil spring 44.

OPERATION

The parking brake is applied when lever 26 is moved counterclockwise as shown in FIG. 3 and brake shoe 14 is cammed into engagement with disc 24. As shoe 14 engages disc 24, the caliper 12 "floats" or shifts axially a slight amount so as to cause both shoes 14 and 16 to engage disc 24 substantially simultaneously.

As wear of the brake shoe linings 18 is experienced, the angular displacement of the lever 26 necessary to cause the shoe 14 and 16 to firmly grip the brake disc 24 increases accordingly. When the angular displacement of the lever 26 exceeds the arcuate length of the ratchet teeth 34, the pawl 42 advances to the next consecutive tooth. The release movement of the lever 26 then causes the fulcrum member 28 to move with the lever 26 in a clockwise direction according to FIG. 3. A second pawl 41 is so positioned on the caliper member 12 so that just before the lever 26 reaches its fully released position the pawl advances to its next successive tooth. This rotation of the fulcrum member 28 transports the lever pivot pin 38 to a new position closer to the brake shoe 14, thus reducing the angular displacement of the lever 26 necessary to fully apply the parking brake upon its next application.

It may be observed from FIG. 3 that pawl 41 prevents the fulcrum member from rotating counterclockwise upon actuation of the parking lever 26.

The foregoing description presents the presently preferred embodiment of the invention. Modification and alterations will occur to those skilled in the art which included within the scope and spirit of the invention.

I claim:

1. In combination with a rotatable brake disc, a brake mechanism comprising:
   first and second friction member frictionally engageable with opposite sides of said disc;
   a caliper member straddling a portion of said disc and engaging at least one of said friction members;
   a fulcrum member rotatably mounted to said caliper member being displaceable relative thereto in the axial direction of said brake disc;
   lever means pivotally mounted to said fulcrum member and having one end engageable with one of said friction members;
   said friction members being relatively movable to frictionally engage the opposite side of the said brake disc in response to displacement of said lever means relative to said caliper member; and
   means to selectively lock said fulcrum member into position relative to said caliper member.

2. A brake mechanism according to claim 1 wherein: said one end of said lever means that is engageable with one of said friction members has a contoured surface of an increasing radii from pivot axis of said lever means.

3. A brake mechanism according to claim 1 and including:
   said lever means rotatably mounted to said fulcrum member to pivot about an axis spaced from the axis of rotation of said fulcrum member; and
   said friction members being relatively movable to frictionally engage to opposite sides of said brake disc in response to angular displacement of said lever means about its pivot axis.

4. A brake mechanism according to claim 3 and including:
   said fulcrum member having a plurality of circumferentially spaced ratchet teeth;
   a first pawl mounted to said actuating lever and engageable with said ratchet teeth;
   a second pawl mounted to said caliper plate and engageable with said ratchet teeth; and
   means to bias said pawls into engagement with said ratchet teeth.

5. A brake mechanism according to claim 3 wherein: said one end of said lever means that is engageable with one of said friction members has contoured surface of an increasing radii from the pivot axis of said lever means.

6. A brake mechanism according to claim and 5 and including: spring means biasing said lever means toward its minimum radius position of engagement with said one friction member.

7. A brake mechanism according to claim 5 and including:
   spring means biassing said first pawl toward locking engagement with one of said ratchet teeth;
   said second pawl lockingly engaging, one of said ratchet teeth to prevent rotation of said fulcrum member relative to said caliper member; and
   said first pawl advancing to the next adjacent ratchet tooth upon clutch actuation when wear of friction member permits angular displacement of said lever means in excess of a predetermined magnitude.